US009261077B2

(12) United States Patent
Tirumalai et al.

(10) Patent No.: US 9,261,077 B2
(45) Date of Patent: Feb. 16, 2016

(54) SYSTEM AND METHOD FOR REAL-TIME LOAD CONTROL OF A WIND TURBINE

(71) Applicant: General Electric Company, Schenectady, NY (US)

(72) Inventors: Suresh S. Tirumalai, Simpsonville, SC (US); Mark Andrew Johnson, Greer, SC (US); Mohan Muthu Kumar Sivanantham, Bangalore (IN); Giridhar Nagraj Ron, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/847,084

(22) Filed: Mar. 19, 2013

(65) Prior Publication Data

US 2014/0284926 A1    Sep. 25, 2014

(51) Int. Cl.
| | |
|---|---|
| *F03D 9/00* | (2006.01) |
| *H02P 9/04* | (2006.01) |
| *F04D 27/02* | (2006.01) |
| *F03D 11/00* | (2006.01) |
| *F01B 25/26* | (2006.01) |
| *F01D 25/00* | (2006.01) |

(Continued)

(52) U.S. Cl.
CPC ............ *F03D 7/0204* (2013.01); *F03D 7/0292* (2013.01); *F05B 2270/332* (2013.01); *Y02E 10/723* (2013.01)

(58) Field of Classification Search
CPC . F03D 11/0091; F03D 7/0024; F03D 7/0204; F03D 7/043; Y02E 10/722; Y02E 10/723; Y02E 10/721; F05B 2260/966; F05B 2270/1095; F05B 2270/309; F05B 2270/322; F05B 2270/327; F05B 2270/328; F05B 2270/329; F05B 2270/334; F05B 2270/802; F05B 2270/808; F05B 2270/821; G01L 5/24
USPC .............. 290/55, 44; 416/61; 415/118, 119, 1
See application file for complete search history.

(56) References Cited

U.S. PATENT DOCUMENTS

| | | | |
|---|---|---|---|
| 6,888,262 B2 * | 5/2005 | Blakemore | ...................... 290/44 |
| 7,004,724 B2 | 2/2006 | Pierce et al. | |

(Continued)

FOREIGN PATENT DOCUMENTS

WO    2011/035977 A1    3/2011

OTHER PUBLICATIONS

European Search Report issued in connection with EP Patent Application No. 14159072.9 dated Jul. 31, 2014.

*Primary Examiner* — Tulsidas C Patel
*Assistant Examiner* — Charles Reid, Jr.
(74) *Attorney, Agent, or Firm* — Dority & Manning, P.A.

(57) ABSTRACT

A system and method for load control of a wind turbine is disclosed. The method includes: selecting a plurality of wind turbine components for load monitoring; defining a load envelope for each of the selected components and storing the load envelopes in a controller, the load envelopes defining a maximum acceptable load capacity for the respective component that may be at or near the component's design capability; directly or indirectly monitoring loads on the selected components and generating corresponding load signals that are communicated to the controller; with the controller, determining if the loads acting on each of the selected components are within the component's respective load envelope; and the controller initiating corrective action in the event that the load acting on any one of the selected components exceeds the component's load envelope.

16 Claims, 5 Drawing Sheets

(51) Int. Cl.
   *F01B 11/00* (2006.01)
   *F04D 29/66* (2006.01)
   *F03D 7/02* (2006.01)

(56) References Cited

U.S. PATENT DOCUMENTS

| | | |
|---|---|---|
| 7,569,945 B2 * | 8/2009 | Pedersen .................... 290/44 |
| 8,029,233 B2 * | 10/2011 | Hoffmann et al. ............ 415/118 |
| 8,262,354 B2 | 9/2012 | Hoffmann |
| 8,301,310 B2 | 10/2012 | Nim |
| 8,360,722 B2 | 1/2013 | Hoffmann et al. |
| 2003/0127862 A1 * | 7/2003 | Weitkamp ................... 290/44 |
| 2004/0112131 A1 | 6/2004 | Wobben |
| 2007/0057517 A1 | 3/2007 | McNerney |
| 2007/0124025 A1 * | 5/2007 | Schram et al. ............... 700/287 |
| 2008/0252076 A1 * | 10/2008 | Fortmann et al. ............ 290/44 |
| 2009/0204266 A1 * | 8/2009 | Lovmand et al. ............ 700/287 |
| 2010/0133814 A1 * | 6/2010 | Schulten ..................... 290/44 |
| 2012/0027566 A1 | 2/2012 | Boerlage et al. |
| 2012/0027589 A1 * | 2/2012 | Haag et al. .................. 416/1 |
| 2012/0061962 A1 * | 3/2012 | Nagasaki ..................... 290/44 |
| 2012/0065901 A1 * | 3/2012 | Bechhoefer et al. .......... 702/34 |
| 2013/0015662 A1 * | 1/2013 | Bertolotti et al. ............ 290/44 |
| 2013/0038060 A1 * | 2/2013 | Odgaard et al. .............. 290/44 |
| 2013/0054043 A1 * | 2/2013 | Klodowski et al. .......... 700/293 |
| 2013/0336760 A1 * | 12/2013 | Li et al. ....................... 415/1 |

* cited by examiner

SYSTEM AND METHOD FOR REAL-TIME LOAD CONTROL OF A WIND TURBINE

FIELD OF THE INVENTION

The present subject matter relates generally to wind turbines and, more particularly, to systems and methods for real-time load control of the wind turbine to increase overall capacity and performance of the wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a nacelle, a rotor, a generator, and a gearbox. The rotor typically includes a rotatable hub and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

A wind turbine and its components must be designed to withstand various loads experienced during operation. The term "component" or "components" when discussed herein in reference to a wind turbine is defined as any wind turbine feature, including, but not limited to, the tower, nacelle, rotor, generator, gearbox, hub, shaft, rotor blade, pitch bearing or drive, yaw bearing or drive, generator frame, bedplate, foundation, or any portion of the wind turbine that may experience a load.

Wind turbine components are typically designed based on simulations representing several events that might occur during the life of the wind turbine, including, but not limited to, wind speed, wind gusts, turbulence intensity, or any other event which causes a load to act on the wind turbine or its components. These events may vary at different wind farm sites; therefore, a safety factor is typically included with the design loads of individual wind turbine components to ensure that catastrophic failures are minimized during an extreme event or random loading condition. Such safety factors, however, generally provide an excess design margin, causing individual wind turbine components to be over-designed. At any given time during the life of the wind turbine, the components are not operating at their design envelopes and there is extra component design margin left, resulting in the components performing below their maximum load capacity during their lifetime.

Many modern wind turbines utilize real-time or asymmetric load control (ALC) systems to control and enhance wind turbine component operation. For example, real-time and/or ALC systems use proximity sensors or strain gages (or combinations of both) to constantly monitor loads at the hub center, and to keep these hub center loads within setpoint limits through blade pitching. These ALC loads are not, however, directly linked to the limiting design loads of the individual components. The setpoint load limits are generally selected to incorporate the safety load factors discussed above to mitigate unforeseen events. With conventional ALC load control methodologies and systems, the wind turbine generator is being under-utilized.

Accordingly, an improved system and method for load control of a wind turbine that utilizes the inherent increased capacity of the various wind turbine components to increase overall performance and output over the life of the wind turbine would be desired in the art.

BRIEF DESCRIPTION OF THE INVENTION

Aspects and advantages of the invention will be set forth in part in the following description, or may be obvious from the description, or may be learned through practice of the invention.

In one embodiment, a method for load control of a wind turbine is disclosed. The method includes: selecting a plurality of wind turbine components for load monitoring; defining a load envelope for each of the selected components and storing the load envelopes in a controller, the load envelopes defining a maximum acceptable load capacity for the respective component as a function of the component's design capability; directly or indirectly monitoring loads on the selected components and generating corresponding load signals that are communicated to the controller; with the controller, determining if the loads acting on each of the selected components are within the component's respective load envelope; and the controller initiating corrective action in the event that the load acting on any one of the selected components exceeds the component's load envelope.

In further embodiments, the selected components may include any one of or combination of the following: a rotor blade, pitch bearing or drive, hub, main shaft, gearbox, bedplate, generator frame, yaw bearing or drive, tower, tower foundation, or similar. In another embodiment, the controller may compute the stress, strain, or deformation from the load signals communicated thereto. In still further embodiments, the corrective action initiated by the controller may include reducing the load on the respective component. For example, the corrective action may include one of or any combination of alarm generation, blade pitching, braking the rotor, stalling the rotor, shutting down the wind turbine, or similar.

In still further embodiments, the load envelopes may be designed at or near the component's design load capability, but below loads that would result in a catastrophic failure of the component. Further, the load envelopes may be defined as a function of the component's design yield limits along any one or combination of the X, Y, or Z axis. Additionally, the load envelopes may allow some degree of yielding along one or more of the X, Y, or Z axis. Moreover, the load envelopes may be defined as a function of stress, strain, or deformation along any one of the X, Y, or Z axis, or a combination thereof.

In other embodiments, the load envelopes may be stored as individual respective modules within the controller, wherein any one of the modules may be replaced or modified. Additionally, the load envelopes may be adjusted as a function of component time in service.

Still further aspects of the invention encompass a wind turbine having a tower; a nacelle mounted atop the tower; a rotor having a rotatable hub and at least one rotor blade for converting wind energy into electrical energy via a shaft; a gearbox; a generator; and a control system configured for load control of the wind turbine. The control system may include: a plurality of sensors disposed to directly or indirectly measure a load acting on a plurality of wind turbine components selected for load monitoring, and to generate corresponding load signals; a controller in communication with the plurality of sensors, the controller having stored therein a load envelope defined for each of the selected wind turbine components, the load envelopes defining a maximum acceptable load capacity for the respective wind turbine component as a function of the component's design capability without an added load safety margin. For example, the load envelope may be designed at or near the component's design load capability. In further embodiments, the controller may be configured to determine if the loads acting on the selected wind turbine components are within the component's load envelope based on the received load signals. Further, the controller may be further configured to initiate a corrective action in the event that the load acting on any one or combination of the monitored components exceeds the component's load envelope. It should also be understood that the control system may be further configured in accordance with any one of the embodiments set forth above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
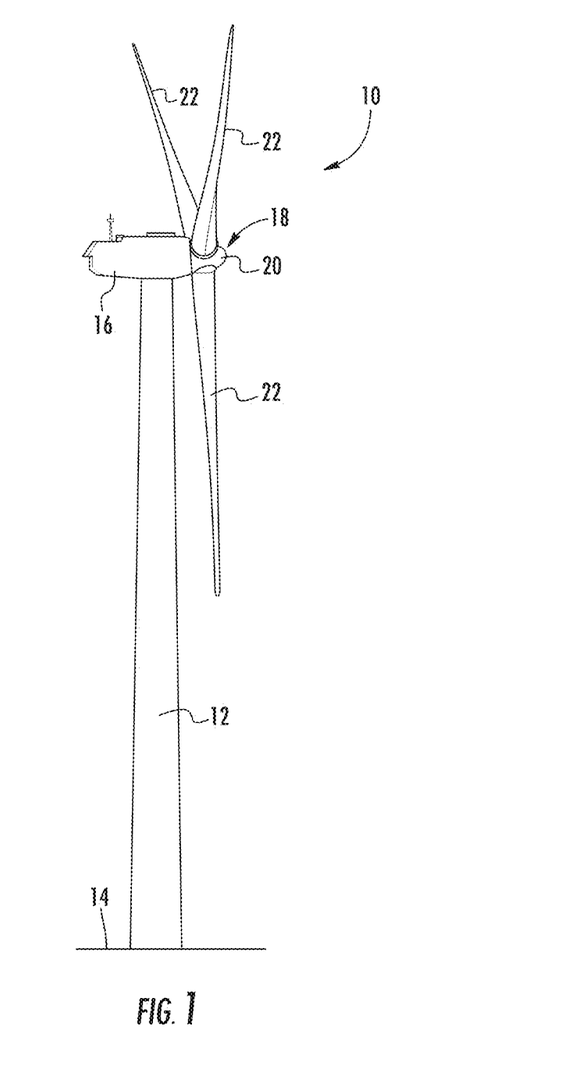
FIG. 1 illustrates a perspective view of one embodiment of a wind turbine according to the present disclosure.
Figure 2:
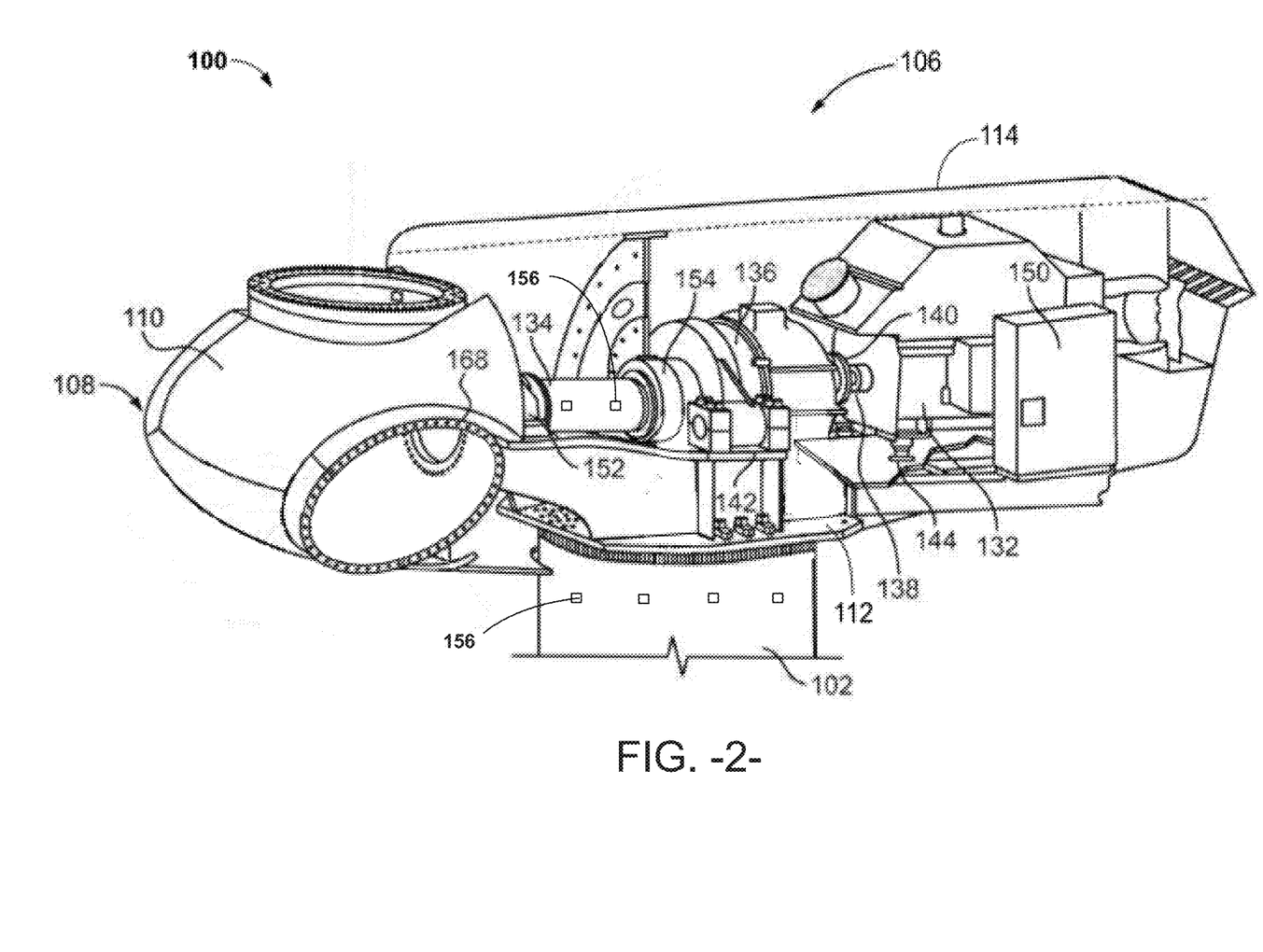
FIG. 2 illustrates a perspective view of one embodiment of a nacelle and tower of a wind turbine according to the present disclosure.

Referring to the drawings, FIG. 1 illustrates a perspective view of one embodiment of a wind turbine 10 according to the present invention. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20 for converting wind energy into electrical energy via a shaft, gearbox, and a generator (FIG. 2). For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Referring now to FIG. 2, a schematic view of a nacelle 106 configured atop a tower 102 of exemplary wind turbine 100 is illustrated. In a particular embodiment, the nacelle 106 may include a bedplate 112 and a cover 114. Further, a rotor 108 may be coupled to the nacelle 106 and may include a hub 110 and a plurality of rotor blades 22 (FIG. 1). The plurality of rotor blades 22 are typically coupled to the hub 110 by pitch bearings 168. Moreover, the rotor 108 may be rotatably coupled to an electric generator 132 positioned within nacelle 106 by rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 with coupling 140 and rotation of high speed shaft 138 facilitates production of electrical power by generator 132. The gearbox 136 and generator 132 may be supported by supports 142 and 144, respectively. Further, the nacelle 106 may include main, or forward and aft, support bearings 152 and 154, respectively.

In accordance with aspects of the invention, the nacelle 106 may include a control system 150 configured for load control of the wind turbine 100. The control system 150 may include a plurality of sensors disposed to directly or indirectly measure a load acting on a plurality of wind turbine components selected for wind turbine monitoring. For example, as illustrated in FIG. 2, a plurality of sensors 156 may be located on selected wind turbine components (such as the rotor shaft 134 and/or the tower 102) so as to measure a load acting on the respective components. The selected wind turbine components, however, are not limited to the illustrated components and may include a blade, pitch bearing or drive, hub, main shaft, gearbox, bedplate, generator frame, yaw bearing or drive, tower, tower foundation, or any combination thereof. In the preferred embodiment, the control system 150 is configured to receive the load signals generated by the plurality of sensors as discussed in greater detail below.

Figure 3:
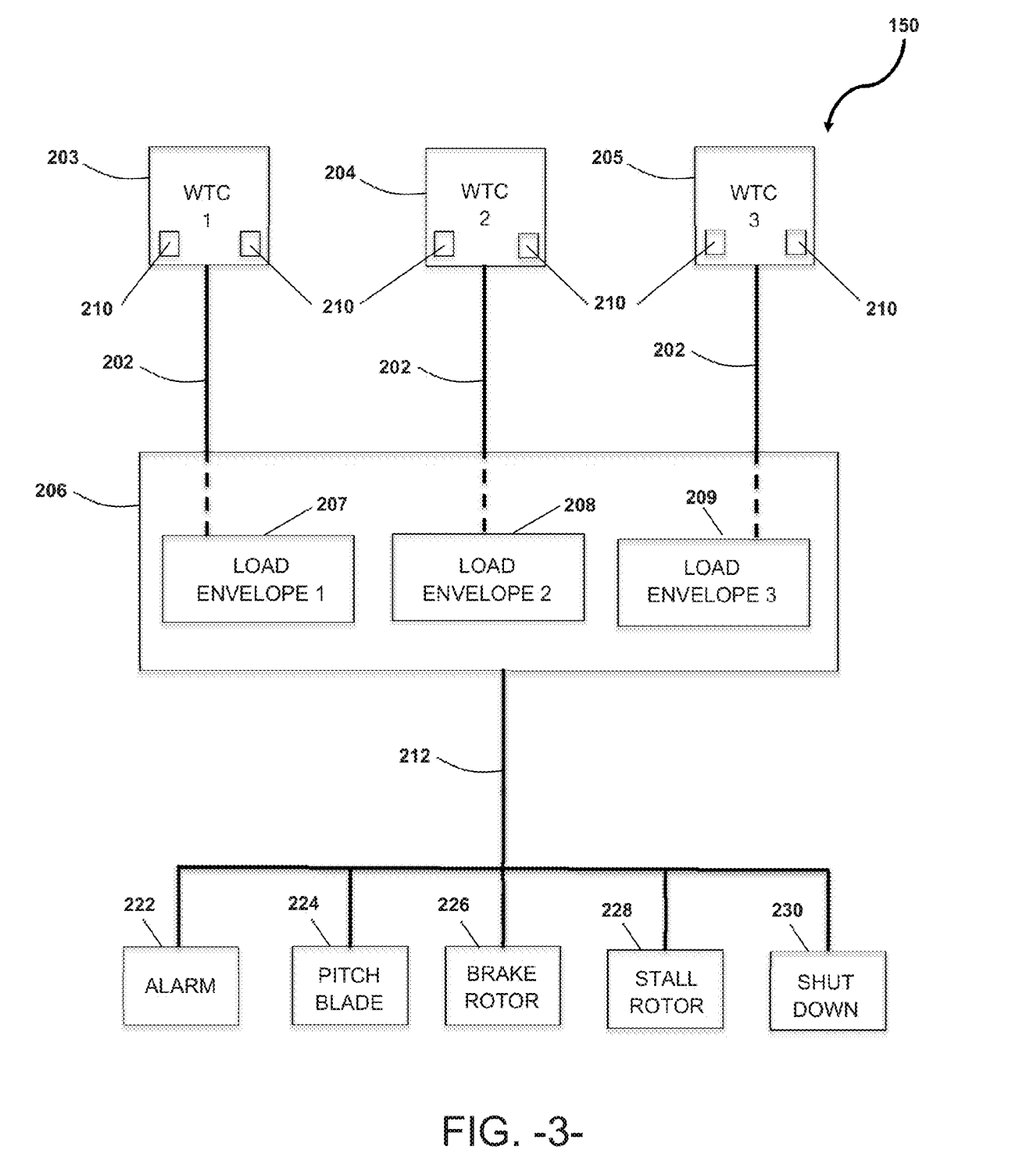
FIG. 3 illustrates a schematic of a system for load control of a wind turbine according to the present disclosure.

Referring now to FIG. 3, a preferred embodiment of the control system 150 according to the present disclosure is illustrated. As mentioned, the control system 150 may include a plurality of sensors 210 disposed to directly or indirectly measure a load acting on a plurality of wind turbine components 203, 204, 205 selected for load monitoring. Further, the sensors 210 are configured to generate corresponding load signals 202. The control system 150 may further include a controller 206 in communication with the sensors 210 so as to receive the corresponding load signals 202. Based on these load signals, the controller 206 may compute the stress, strain, or deformation of a selected wind turbine component. The controller 206 may encompass one controller that is common to the load envelopes, multiple parallel controllers wherein an individual controller is assigned to an individual load envelope, or any suitable combination of controllers for performing the desired functions as set forth herein.

It should be appreciated that the system 150 is not limited to any particular type or configuration of sensors 210. Various load sensors are known and used in the art, and may be used with systems and methods of the present invention. Examples of such sensors include accelerometers, proximity sensors, pressure sensors, strain gauges, or any combinations thereof.

In the preferred embodiment, the controller 206 includes at least one load envelope stored therein as an electronic file or record defined for a single wind turbine component. For example, in the illustrated embodiment, the controller 206 includes three load envelopes 207, 208, 209 corresponding to each of the selected wind turbine components 203, 204, 205. The load envelopes 207, 208, 209 define a maximum acceptable load capacity for the respective wind turbine component 203, 204, 205, which is a function of the component's design load capability. For example, this maximum acceptable load capacity may be at or near the component's design capability without an added load safety margin.

Figure 4:
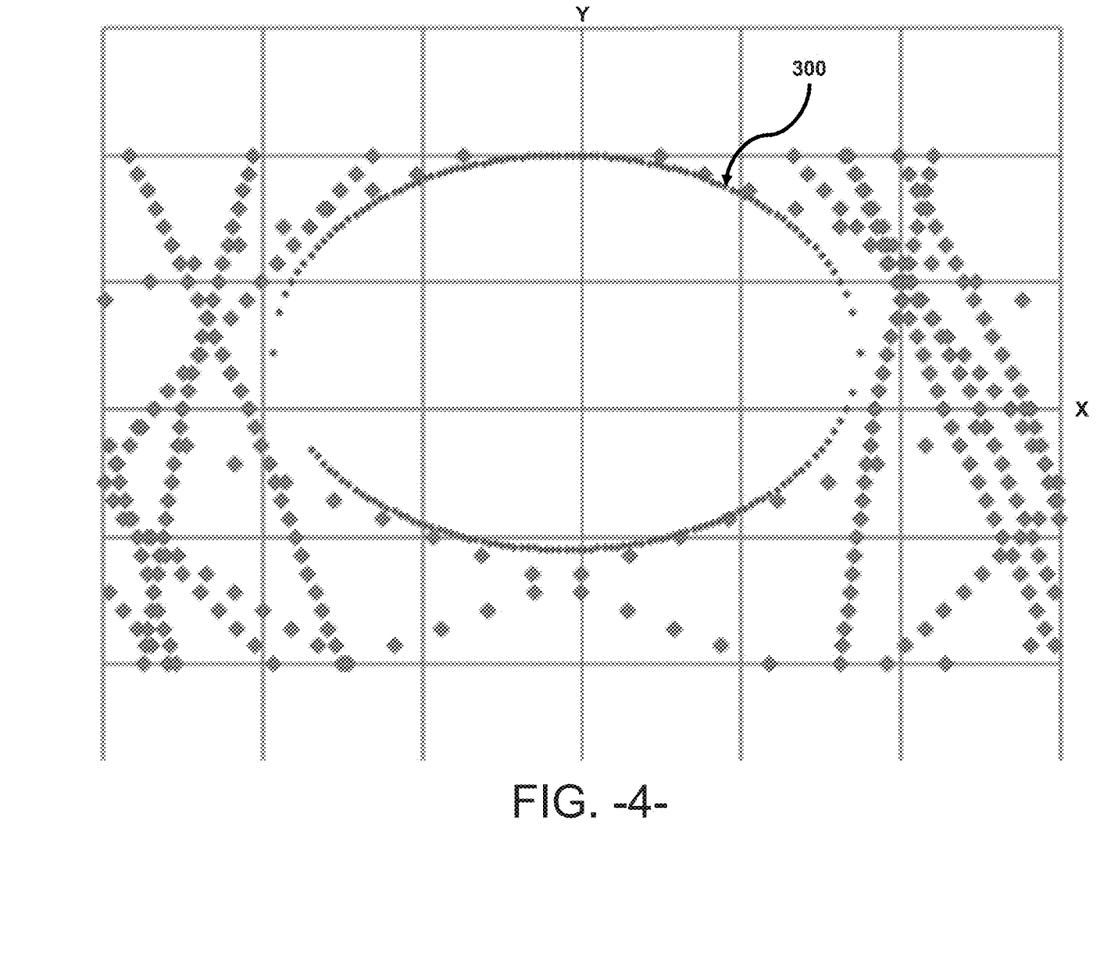
FIG. 4 illustrates one embodiment of a load envelope according to the present disclosure.

In one particular embodiment, the component's design capability may be defined by a three-dimensional load envelope in the X, Y, and Z directions. Further, the load envelope may be modeled using finite element analysis, transfer functions, or any similar modeling method known in the art. As such, the load envelope may compute the stress, strain, tension, compression, or deformation on the monitored component. For example, as shown in FIG. 4, one example of a load envelope 300 for a wind turbine component is illustrated. The load envelope 300 has a general elliptical shape and is illustrated in the X-Y plane. As such, the illustrated load envelope 300 represents a slice from the real-time three-dimensional load envelope defining the component's design load capability in the X, Y, and Z directions.

By incorporating such load envelopes, the wind turbine is able to operate at or near its maximum design capacity without triggering a failure of the component rather than its safety factor design, thereby increasing energy production. In the preferred embodiment, the load envelopes take advantage of the added design margins of the components without triggering a catastrophic failure. Further, real-time or ALC monitoring may be employed in the preferred embodiment so as to constantly monitor loads acting on various wind turbine components. Additionally, one or more strain gauges or sensors may be employed to monitor various wind turbine components. Such measurements may be fed directly to the load envelopes. As such, the control system 150 may trigger a corrective action if necessary. Further, the load envelopes may be stored as individual respective modules (i.e., individual files) within the controller 206 that are essentially unattached or unrelated functionally to other to the other component modules such that any one of the modules may be replaced or modified as necessary without disrupting the monitoring functionality of the other wind turbine components within the system.

In the preferred embodiment, the system and method disclosed herein combine real-time monitoring with load envelopes eliminating safety factors, such that the control system is able to push the wind turbine's operating capacity without exceeding design limits. For example, the controller 206 may be configured to constantly receive the load signals 202 and determine if the loads acting on the selected wind turbine components 203, 204, 205 are within the component's corresponding load envelope 207, 208, 209.

In the event that a load exceeds a component's load envelope, the controller 206 may initiate a corrective action 212. In a particular embodiment, the corrective action 212 initiated by the controller 206 may include reducing the load on the respective component. More specifically, the corrective action 212 may include one of or any combination of alarm generation 222, blade pitching 224, braking the rotor 226, stalling the rotor 228, shutting down the wind turbine 230, or any suitable action to reduce the load acting on the respective component. Further, it should be understood that braking the rotor may include application of a mechanical break, changing the yaw position of the hub, or similar action. Moreover, the corrective action may be tailored to the respective component to provide appropriate load reduction. For example, a corrective action for a deformation occurring in on the main shaft may require blade pitching, whereas a corrective action needed to reduce a load on the tower may require changing the yaw position.

Accordingly, the load envelopes are designed below loads that would result in a catastrophic failure of the respective wind turbine component. As such, the control system is capable of monitoring a load and sending a corrective action before a catastrophic failure occurs on the component. The load envelopes may also be defined as a function of the respective wind turbine component's design yield limits along any one or combination of X, Y, or Z axis and may allow some degree of component yielding along one or more of the X, Y, or Z axis. Additionally, the load envelopes may be defined as a function of any one or combination of stress, strain, or deformation along any one of the X, Y, or Z axis.

Figure 5:
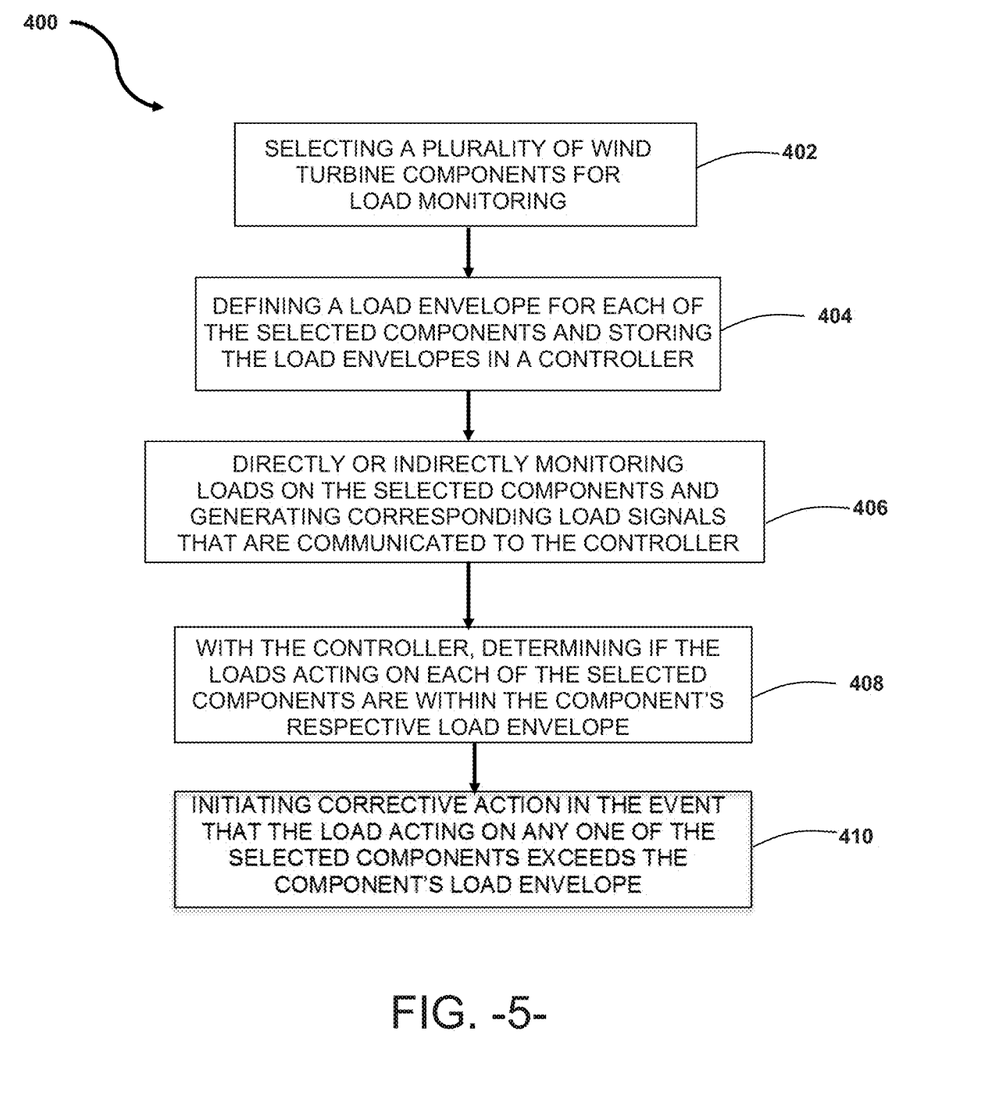
FIG. 5 illustrates one embodiment of a method for load control of a wind turbine according to the present disclosure.

Referring now to FIG. 5, a method 400 for load control of a wind turbine is illustrated. The method 400 includes a first step (step 402) of selecting a plurality of wind turbine components for load monitoring. In a next step (step 404), the method 400 includes defining a load envelope for each of the selected components and storing the load envelopes in a controller, the load envelopes defining a maximum acceptable load capacity for the respective component that may be, for example, at or near the component's design capability. In another step (step 406), the method 400 includes directly or indirectly monitoring loads on the selected components and generating corresponding load signals that are communicated to the controller. In a next step (step 408), the method 400 includes determining if the loads acting on each of the selected components are within the component's respective load envelope via a controller. In another step (step 410), the method 400 includes initiating a corrective action in the event that the load acting on any one of the selected components exceeds the component's load envelope. Additionally, the load envelopes may be adjusted as a function of component time in service.

The system and method described herein utilize the inherent increased capacity of the various wind turbine components (due to the design safety factor included with each wind turbine component) and real-time monitoring to increase overall performance and output over the life of the wind turbine. As such, existing wind turbines may experience increased capacity without triggering catastrophic failure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for load control of a wind turbine, comprising:
   selecting a plurality of wind turbine components for load monitoring;
   prior to load monitoring, generating, via a computer-generated model, a plurality of load vectors the X, Y, and Z directions for each of the selected Components, the load vectors based on at least one of wind turbine test data or real-time wind turbine operating data;
   plotting the load vectors on a three-dimensional graph;

defining, via the computer-generated model, a three-dimensional load envelope based on the plotted load vectors for each of the selected components;

storing the load envelopes in a controller, the load envelopes providing a maximum acceptable load capacity for the respective component, the load envelopes being defined as a function of the component's design yield limit in the X, Y, and Z directions and at least one of stress, strain, or deformation of the component in the X, Y, and Z directions such that the maximum acceptable load capacity is designed at or near the component's design load capability, but below a load capacity that would result in a catastrophic failure of the component;

directly or indirectly monitoring real-time loads on the selected components and generating corresponding load signals that are communicated to the controller;

after defining the three-dimensional load envelope within the load vectors for each of the selected components and storing the load envelopes in the controller, determining, with the controller, if the monitored real-time loads acting on each of the selected components are within the component's respective three-dimensional load envelope; and initiating, via the controller, corrective action in the event that the load acting on any one of the selected components exceeds the component's three-dimensional load envelope.

2. The method as in claim 1, wherein the selected components include any combination of blade, pitch bearing or drive, hub, main shaft, gearbox, bed plate, generator frame, yaw bearing or drive, tower, or tower foundation.

3. The method as in claim 1, wherein the corrective action initiated by the controller includes reducing the load on the respective component.

4. The method as in claim 3, wherein the corrective action is tailored to the respective component to provide appropriate load reduction.

5. The method as in claim 4, wherein the corrective action includes any combination of alarm generation, blade pitching, braking the rotor, stalling the rotor, or shutting down the wind turbine.

6. The method as in claim 1, wherein the load envelopes are defined as a function of the component's design yield limits in the X, Y, or Z directions and allow some degree of yielding along one or more of the X, Y, or Z axis.

7. The method as in claim 1, wherein the controller computes the stress, strain, or deformation from the load signals communicated thereto.

8. The method as in claim 1, wherein the load envelopes are stored as individual respective modules within the controller, wherein any one of the modules can be replaced or modified.

9. The method as in claim 1, wherein the load envelopes are adjusted as a function of component time in service.

10. A wind turbine, comprising:
a tower;
a nacelle mounted atop the tower;
a rotor, the rotor having a rotatable hub and at least one rotor blade for converting wind energy into electrical energy via a shaft, gearbox, and a generator;
a control system configured for load control of the wind turbine, the control system further comprising:
a plurality of sensors disposed to directly or indirectly measure real-time loads acting on a plurality of wind turbine components selected for load monitoring, and to generate corresponding load signals;
a controller in communication with the plurality of sensors, the controller configured to perform one or more operations, the one or more operations comprising;
prior to load monitoring, generating a plurality of load vectors in the X, Y, and Z directions, for each of the selected components, the load vectors based on at least one of wind turbine test data or real-time wind turbine operating data,
plotting the load vectors on a three-dimensional graph,
defining, via the computer-generated model, a three-dimensional load envelope based on the plotted load vectors for each of the selected components,
the load envelopes providing a maximum acceptable load capacity for the respective component, the load envelopes being defined as a function of the component's design yield limit in the X, Y, and Z directions and at least one of stress, strain, or deformation of the component in the X, Y, and Z directions such that the maximum acceptable load capacity is designed at or near the component's design load capability, but below a load capacity that would result in a catastrophic failure of the component;
based on the received real-time load signals, the controller configured to determine if the loads acting on the selected wind turbine components are within the component's three-dimensional load envelope; and
the controller further configured to initiate a corrective action in the event that the load acting on one of the selected components exceeds the component's three-dimensional load envelope.

11. The wind turbine as in claim 10, wherein the selected wind turbine components include any combination of blade, pitch bearing or drive, hub, main shaft, gearbox, bed plate, generator frame, yaw bearing or drive, tower, or tower foundation.

12. The wind turbine as in claim 10, wherein the corrective action initiated by the controller includes reducing the load on the respective component.

13. The method as in claim 12, wherein the corrective action is tailored to the respective component to provide appropriate load reduction.

14. The wind turbine as in claim 13, wherein the corrective action includes any combination of alarm generation, blade pitching, braking the rotor, stalling the rotor, or shutting down the wind turbine.

15. The wind turbine as in claim 10, wherein the load envelopes are defined as a function of the respective wind turbine component's design yield limits in the X, Y, or Z directions and allow some degree of component yielding along one or more of the X, Y, or Z axis.

16. The wind turbine as in claim 10, wherein the load envelopes are stored as individual respective modules within the controller, wherein any one of the modules can be replaced or modified.

* * * * *